United States Patent Office 3,257,333
Patented June 21, 1966

3,257,333
CONVERSION OF METHYL HALIDES TO HIGH MOLECULAR WEIGHT ORGANIC COMPOSITIONS
Edgar Allan Blair, Drexel Hill, Pa., assignor to Sun Oil Company, Philadelphia, Pa., a corporation of New Jersey
No Drawing. Filed Sept. 30, 1960, Ser. No. 59,475
5 Claims. (Cl. 260—2)

This invention relates to the conversion of methyl halides to hydrocarbonaceous materials of higher molecular weight. More particularly, the invention relates to the conversion of methyl halides such as methyl chloride and methyl bromide to a hydrocarbonaceous tar by means of a dehydrohalogenation-condensation reaction.

Previously, it has been known to treat relatively low molecular weight halogenated hydrocarbons to obtain hydrocarbons of higher molecular weight. Little has been done with methyl halides and other normally gaseous hydrocarbons because of the high temperatures required to effect the conversion. More particularly, no evidence has been found that methyl halides could be converted in high yield to compositions which are solid or semi-solid at room temperature.

Therefore, it is the object of this invention to provide a process of converting methyl halides into novel products and thus advance the utilization of methane and methyl halides.

It has now been found that methylchloride or methyl bromide condenses to form a semi-solid tar at relatively low temperatures. In characterizing the product, the term hydrocarbonaceous has been used because a small amount of chlorine or bromine, depending on which methyl halide is undergoing treatment, is present and thus the tar is not a pure hydrocarbon. It contains about one chlorine or bromine atom per 118 hydrogen atoms. The product has a hydrogen to carbon ratio of about 1.5 to 1. The infra-red spectrum shows some double bonds, but no aromaticity. The tar has utility as a coating composition as evidenced by the smooth tough coating formed when it is applied to a steel plate. It may be mixed with solvents, fillers and other materials which are commonly used to give desired properties in coating compositions.

Methyl chloride for use in the process of the invention may be obtained from any suitable source. It is prepared commercially by the hydrochlorination of methanol followed by treatment with water, sodium hydroxide and concentrated sulfuric acid. Another source is the chlorination of methane with free chlorine. Methyl bromide is also readily available.

Aluminum chloride or aluminum bromide is used as catalyst for the reaction. It should be essentially anhydrous and is used in amounts of from .01 to 25 weight percent based on the methyl chloride or methyl bromide feed. HCl or HBr may be used as promoter for the corresponding aluminum halide but it is not essential that a promoter be present. Up to 25 weight percent promoter, based on the methyl halide may be added.

The temperature of the reaction is preferably maintained in the range of 180 to 245° C. for the best reaction rate. Pressure control is not a critical item and a range of 15 to 1000 p.s.i.a. is suitable. Higher pressures may be used if desired.

The process and product of the invention are more fully illustrated by the following example:

5 grams of anhydrous aluminum chloride were placed in a 300 cc. metal bomb. The bomb was evacuated, then 300 cc. of hydrogen chloride were fed in. 24 grams of methyl chloride were fed into the bomb from a pressure bottle and the reactants heated for 12 hours at 200° C. After cooling, gas phase comprising methane and HCl in a ratio of about 1 to 5 was vented from the reactor. The bomb was opened and filled with ice to decompose the catalyst. The solid product was removed from the reactor by washing with carbon tetrachloride. The solvent was distilled off and about 10 grams of solid product remained. Elemental analysis on the tar shows 87.6% C, 10.9% H and 1.5% Cl. The product is soluble in common non-polar solvents but is so viscous that it will not flow at room temperature. It is important to note that the total reaction product is a semi-solid tar rather than a broad spectrum of liquids, semi-solids and solids.

When aluminum bromide is substituted for aluminum chloride as the catalyst and when methyl bromide is substituted for methyl chloride as the feed, the results are substantially the same.

When the reaction is conducted according to the description set forth in this specification, the product will contain less than 2 percent halogen by weight.

I claim:
1. The process consisting essentially of the steps of heating a mixture consisting essentially of (1) a reactant material selected from the group consisting of methyl chloride and methyl bromide and (2) a catalyst consisting essentially of materials selected from the group consisting of aluminum bromide, aluminum bromide promoted with HBr, aluminum chloride and aluminum chloride promoted with HCl to a temperature in the range of from 180 to 245° C. for a time in the range of from about 30 minutes to about 24 hours, removing methane and hydrogen halide, separating the catalyst and recovering a hydrocarbonaceous tar having a hydrogen to carbon ratio of about 1.5 to 1, said tar containing a small amount of a halogen selected from the group consisting of chlorine and bromine.

2. The process for the conversion of methyl chloride consisting essentially of the steps of contacting said methyl chloride with anhydrous aluminum chloride catalyst and an HCl promoter at a temperature in the range of from 180 to 245° C. for a time in the range of from about 30 minutes to about 24 hours, removing methane and hydrogen chloride, hydrolyzing the aluminum chloride, dissolving the product in a solvent and recovering from the solvent a hydrocarbonaceous tar having a hydrogen to carbon ratio of about 1.5 to 1, said tar containing a small amount of chlorine.

3. As a composition, the tar produced by the process of claim 2.

4. The process for the conversion of methyl bromide consisting essentially of the steps of contacting said methyl bromide with anhydrous aluminum bromide catalyst and an HBr promoter at a temperature in the range of from 180 to 245° C. for a time in the range of from about 30 minutes to about 24 hours, removing methane and hydrogen bromide, hydrolyzing the aluminum bromide, dissolving the product in a solvent and recovering from the solvent a hydrocarbonaceous tar having a hydrogen to carbon ratio of about 1.5 to 1, said tar containing a small amount of bromine.

5. As a composition, the tar produced by the process of claim 4.

References Cited by the Examiner
UNITED STATES PATENTS

| | | | |
|---|---|---|---|
| 1,216,174 | 2/1917 | Sifton | 260—671 |
| 1,891,415 | 12/1932 | Harlow et al. | 260—658 |
| 2,848,472 | 8/1958 | Cottle | 260—448 |

LEON ZITVER, *Primary Examiner.*
ALPHONSO D. SULLIVAN, *Examiner.*